United States Patent
Nagayama et al.

(10) Patent No.: US 6,891,290 B2
(45) Date of Patent: May 10, 2005

(54) FULLY ENCLOSED TYPE MOTOR WITH OUTER FANS

(75) Inventors: Takashi Nagayama, Yokohama (JP); Minoru Kitamura, Fuchu (JP); Shigetomo Shiraishi, Fuchu (JP); Tadashi Matsuura, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/718,620

(22) Filed: Nov. 24, 2003

(65) Prior Publication Data

US 2004/0150270 A1 Aug. 5, 2004

(30) Foreign Application Priority Data

Nov. 25, 2002 (JP) ..................................... 2002-341278

(51) Int. Cl.$^7$ ............................................... H02K 9/00
(52) U.S. Cl. ........................................................ 310/58
(58) Field of Search ..................... 310/52, 58, 59–60 R, 310/61–63, 60 A

(56) References Cited

U.S. PATENT DOCUMENTS

| | | | | |
|---|---|---|---|---|
| 2,604,501 A | * | 7/1952 | Wightman | 310/63 |
| 2,970,233 A | * | 1/1961 | Penney | 310/63 |
| 3,648,086 A | * | 3/1972 | Renner et al. | 310/63 |
| 6,653,755 B2 | * | 11/2003 | Machiroutu | 310/64 |
| 6,657,332 B2 | * | 12/2003 | Balas | 310/58 |

FOREIGN PATENT DOCUMENTS

JP 57-77889 5/1982

* cited by examiner

*Primary Examiner*—Tran Nguyen
(74) *Attorney, Agent, or Firm*—Finnegan, Henderson, Farabow, Garrett & Dunner, L.L.P.

(57) ABSTRACT

A fully enclosed type motor with outer fans includes a ventilation fan. The fan has radially extending blades on a bracket side, and radially extending blades on a core side. Outside air is let into an air passage as cooling air from an opening formed in the bracket on an inner side of the blades. The cooling air is fed into a cooling hole formed in an outer peripheral part of a stator core and then discharged to the outside. Air within the motor body, which is fed from the blades, is passed through an external heat exchanger and returned to the inside of the motor body.

18 Claims, 16 Drawing Sheets

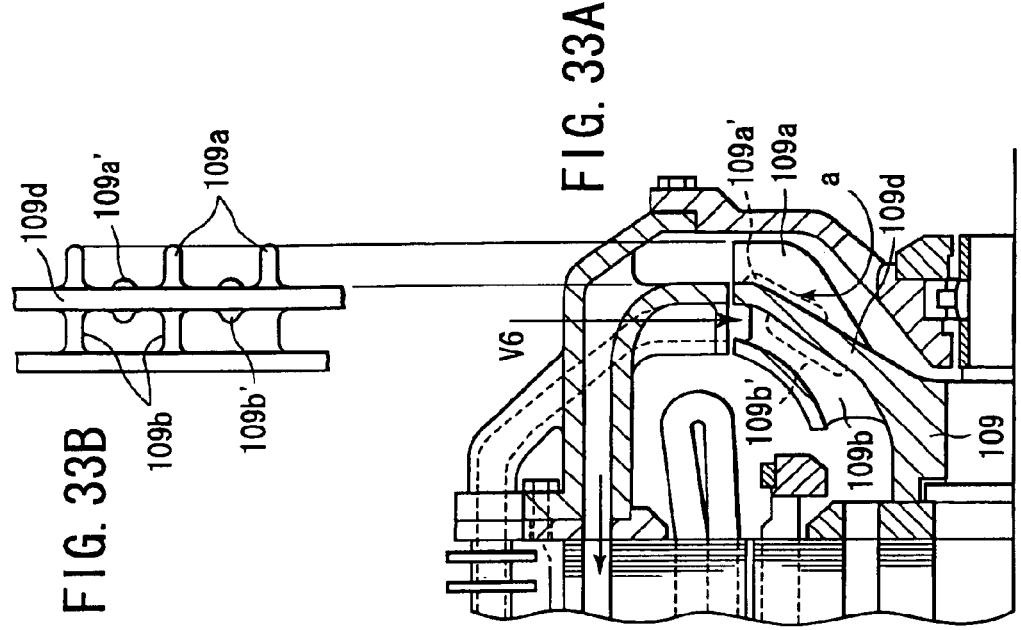
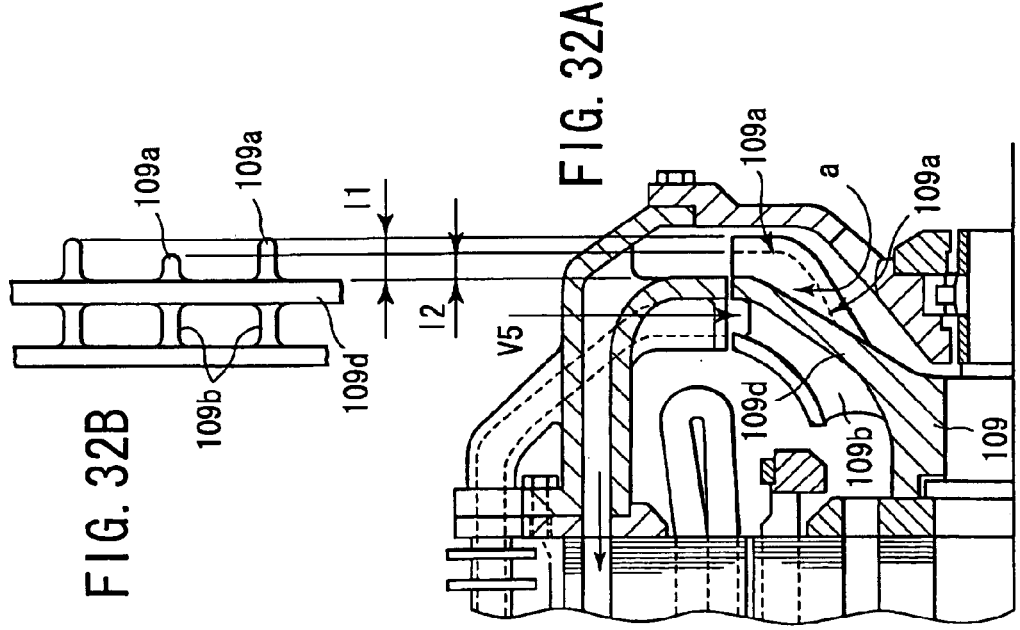

FULLY ENCLOSED TYPE MOTOR WITH OUTER FANS

CROSS-REFERENCE TO RELATED APPLICATIONS

This application is based upon and claims the benefit of priority from the prior Japanese Patent Application No. 2002-341278, filed Nov. 25, 2002, the entire contents of which are incorporated herein by reference.

BACKGROUND OF THE INVENTION

1. Field of the Invention

The present invention relates to a fully enclosed type motor with outer fans, which is applicable to a car-driving motor, etc.

2. Description of the Related Art

In general, in a railway car, a car-driving motor is mounted on a bogie disposed under the car body. A torque of the motor is transmitted to wheels via a gear unit, thus driving the car. This type of conventional motor has a structure shown in FIG. 1.

In FIG. 1, the conventional car-driving motor has a cylindrical frame 1 that is a fixed-side member. A bracket 2 is attached to one end of the frame 1, and a housing 3 is attached to a central part of the other end of the frame 1. Both end portions of a rotor shaft 6 are rotatably supported on bearings 4 and 5 provided at central parts of the bracket 2 and housing 3.

A rotor core 7 is fixed to an axially middle part of the rotor shaft 6. Rotor bars 8 are embedded in a number of grooves formed in the outer peripheral surface of the rotor core 7. Both end portions of each rotor bar 8 are protruded from the rotor core 7. The protruded parts of the rotor bars 8 are integrally coupled by end rings 201. Thus, a cage rotor of an induction motor is constituted. A plurality of vent holes 7a are formed in the rotor core 7 so as to axially penetrate the rotor core 7, and both end portions of the rotor core 7 are sandwiched by core holders 202 having vent holes.

A cylindrical stator core 10 is attached to an inner peripheral part of the frame 1. A stator coil 11 is provided in a number of grooves formed in the inner peripheral surface of the stator core 10. Coil end portions of the stator coil 11 are protruded from both sides of the stator core 10.

A uniform gap 200 is defined between the inner peripheral surface of the stator core 10 and the outer peripheral surface of the rotor core 7. A drive-side end 6a of the rotor shaft 6 is projected from the motor body. A coupler for coupling with a drive gear unit is attached to the projected drive-side end 6a.

A ventilation fan 9 is fixed to that part of the rotor shaft 6, which is located within the motor body. The ventilation fan 9 has a plurality of blades 9a extending radially from the center of the fan 9. A plurality of exhaust ports 1a are formed in the circumferential direction of the frame 1 in that part of the frame 1, which is opposed to an outer peripheral part of the ventilation fan 9.

An air inlet 1b is provided at an upper part of the non-driving-side part of the frame 1. An air filter unit 12 is provided so as to cover the air inlet 1b. A filter 12a for capturing dust is attached to the entire area of an outside air intake port of the filter unit 12.

The entirety of the motor shown in FIG. 1 is secured to the bogie such that attachment arms provided on the frame 1 are fastened to the bogie by means of bolts. A torque of the motor is transmitted to the gear unit via the coupler attached to the end portion 6a of the rotor shaft 6, and then to the wheels, thereby driving the car.

In operation of the motor, the stator coil 11 and rotor bars 8 of the motor generate heat. A rise in temperature of the motor is suppressed by feeding outside air into the motor and cooling the stator coil 11 and rotor bars 8. The cooling operation is described below.

When the motor is operated, the ventilation fan 9 is rotated by the rotor shaft 6 and air within the motor is exhausted from the exhaust ports 1a. Accordingly, outside air is sucked in from the air inlet 1b. The air, which has come in from the air inlet 1b via the filter unit 12, passes through the vent holes in the rotor core 7 and the gap between the outer peripheral surface of the rotor core 7 and the inner peripheral surface of the stator core 10. Then, the air comes to the ventilation fan 9 and is exhausted from the exhaust ports 1a by the rotation of the fan 9.

By passing the outside air through the motor body, as described above, the rotor bars 8, stator coil 11, bearings 4 and 5 and other parts of the motor are cooled. Thereby, the temperatures of the rotor bars 8, stator coil 11, bearings 4 and 5 and the grease for lubricating them are prevented from rising over the tolerable temperature range.

However, ambient air of the car-driving motor, which is mounted on the underfloor bogie of the car, contains a large quantity of dust that swirls while the car is running. Outside air to be sucked in the motor is not clean. To solve the problem, in the conventional car-driving motor shown in FIG. 1, dust in the outside air to be taken in the body of the motor is captured by the filter 12a of the filter unit 12 and the air is cleaned. With long-time driving of the motor, the filter 12a is gradually clogged and the amount of air passing through the motor body decreases. This poses a technical problem in that frequent periodical maintenance of the filter has to be conducted and a great deal of labor is needed for the maintenance.

To solve this problem, in recent years, a fully-opened-outer-fan-cooling type car-driving motor has been developed. A fully enclosed type motor with such an outer fan will now be described with reference to FIG. 2.

In FIG. 2, a bracket 14 is provided on a drive-side end portion of a bottomed cylindrical frame 13. A housing 3 is provided on a central part of a non-drive-side end portion of the frame 13. A stator core 10 is provided on an inner peripheral portion of the frame 13.

A rotor shaft 6 is rotatably supported on bearings 4 and 5 attached to the bracket 14 and housing 3. A rotor core 7 is fixed to an axially middle part of the rotor shaft 6. A drive-side end portion of the rotor shaft 6 is projected from the motor body, and a ventilation fan 15 is attached to the projected portion of the rotor shaft 6.

A number of axially extending cooling holes 16 are provided on the outer periphery of the frame 13. The cooling holes 16 define air passages 17. The air passages 17 are also formed in the bracket 14, and the drive-side of each air passage 17 is open toward the outer periphery of the ventilation fan 15. The non-drive-side of the air passages 17 is open to the outside. An air inlet 15a of the ventilation fan 15 on the drive-side of the motor defines an outside air intake port.

The fully enclosed type motor with outer fans, as shown in FIG. 2, is configured such that the inside of the motor is completely shielded from the outside. Thus, heat generated within the motor is mainly radiated via many cooling holes 16 provided on the outer periphery of the frame 13. In operation, the ventilation fan 15 is rotated to make outside air axially flow through the air passages 17 of the cooling holes 16 provided on the outer periphery of the frame 13. Thus, heat generated from the stator coil 11, which has conducted via the core 10 and frame 13, is radiated to the outside from the wall surface in the cooling holes 16.

In this fully enclosed type motor with outer fans, since outside air is not made to pass through the inside of the motor, the inside of the motor is not contaminated with dust. Further, since the outer part of the motor is cooled with outside air, there is an advantage that a filter for removing dust in outside air is needless.

There is known an example of the fully enclosed motor shown in FIG. 2, wherein a fan is provided outside the motor, and heat generated in the motor is forcibly radiated to the outside (e.g. Jpn. Pat. Appln. KOKAI Publication No. 57-77889).

However, in the fully enclosed motors shown in FIGS. 1 and 2, there are the following technical problems, and improvements in these car-driving motors have been desired.

First, the cooling performance of the rotor bars 8 is not good. Compared to the cooling of the stator coil 11 by means of heat transmission of the stator core 10, the rotor bars 8 are cooled by indirect heat transmission using air with low heat conductivity.

Consequently, heat of the rotor raises the temperature of the bearings 4 and 5 directly through the rotor shaft 6, or indirectly through heated air within the motor body. The tolerable temperature of the bearings 4 and 5 and the grease for lubricating them is lower than that of the rotor bars 8 and stator coil 11. The former is about haft the value of the latter.

In consideration of this fact, the motor has to be designed by taking into account the tolerable temperature of the bearings 4 and 5 and the grease, rather than the tolerable temperature of the rotor bars 8. As a result, the output power of the motor becomes lower than the conventional motors.

Moreover, since the temperature of the grease increases, the life thereof becomes shorter and the purpose of reducing the frequency of maintenance with use of the fully enclosed structure cannot be achieved.

Secondly, as shown in FIGS. 3 and 4 that depict a driving motor for a railway car, a vehicle that is called a bogie is mounted in chassis-related equipment. A driving motor 301 is secured by means of attachment arms 302 to an attachment seat 305 provided on a beam 304 of the bogie 303.

A coupler 306a is attached to a rotor shaft 306 of the driving motor 301 configured as shown in FIG. 1. The coupler 306a is, in turn, connected to a gear unit 307. The driving shaft of the gear unit 307 is a shaft 308 connected to the coupler 306a, and the driven shaft of the gear unit 307 is a wheel shaft 309. Wheels 310 are attached to both end portions of the wheel shaft 309. The wheels 310 can rotate and run on rails 311.

Bearings 312, which are mounted on the bogie 303, are attached to both end portions of the wheel shaft 309 and rotatably support the wheel shaft 309. A car body 313 is mounted on the bogie 303. If the motor 301 is powered on, a torque of the motor 301 is successively transmitted from the rotor shaft 306 to the coupler 306a to the gear unit 307 to the wheel shaft 309 to the wheels 310. Thus, the car body 313 is driven.

Design constraints peculiar to railway cars are imposed on the axial dimension L of the motor. That is, the axial dimension L is restricted by the inside width Ls between the wheels, as shown in FIG. 3, and cannot be made greater than the design requirement.

Thus, the motor has to be designed, while making the axial dimension of the motor as small as possible. To provide two fans that require large space is very disadvantageous.

BRIEF SUMMARY OF THE INVENTION

The object of the present invention is to solve the above problems and to provide a fully enclosed type motor with outer fans, which is ideal as a driving motor for a railway car, wherein heat generation of rotor bars within the fully enclosed motor designed to reduce the frequency of dust cleaning is suppressed, heat conduction to bearings is suppressed, and the life of the bearings and grease is not decreased.

In order to achieve the object, the invention provides a fully enclosed type motor with outer fans, comprising: a stator core; a rotor core disposed on an inner peripheral side of the stator core; a first bearing provided at one end of the stator core via a bracket; a second bearing provided at the other end of the stator core via a housing that is attached to the bracket by means of a fixing member; a rotor shaft to which the rotor core is attached, the rotor shaft being rotatably supported by the first and second bearings; a ventilation passage formed in an outer peripheral part of the stator core; an external heat exchanger; first and second blades provided on the rotor shaft; an air passage including the first blades, an opening formed in the bracket, and a cooling hole formed in the outer peripheral part of the stator core; and an internal circulation air passage including the second blades and the external heat exchanger.

In order to achieve the object, the invention also provides a fully enclosed type motor with outer fans, comprising: a first bearing provided at one end of a stator core via a bracket; a second bearing provided at the other end of the stator core via a housing member; a rotor shaft to which the rotor core is attached, the rotor shaft being rotatably supported by the first and second bearings; and a ventilation fan fixed to the rotor shaft and having a first blade formed on the bracket side and a second blade formed on the rotor core side.

In order to achieve the object, the invention also provides a car motor for driving wheels that run on rails, comprising: a motor body; an air passage formed in an outer peripheral part of a stator core disposed within the motor body; a ventilation fan with first and second blades fixed to a rotor shaft disposed in the motor body; an external heat exchanger disposed on a side of the motor body, which faces the rails; and a fin provided on the external heat exchanger in parallel with a direction of running of the wheels.

BRIEF DESCRIPTION OF THE SEVERAL VIEWS OF THE DRAWING

FIG. 32A is a cross-sectional view of a fully enclosed type motor with outer fans according to another embodiment of the present invention, as viewed from the lateral side, and FIG. 32B is a cross-sectional view taken along line V5—V5 in FIG. 32A;

FIG. 33A is a cross-sectional view of a fully enclosed type motor with outer fans according to another embodiment of the present invention, as viewed from the lateral side, and FIG. 33B is a cross-sectional view taken along line V6—V6 in FIG. 33A.

DETAILED DESCRIPTION OF THE INVENTION

Embodiments of the present invention will now be described with reference to the accompanying drawings.

Figure 5:
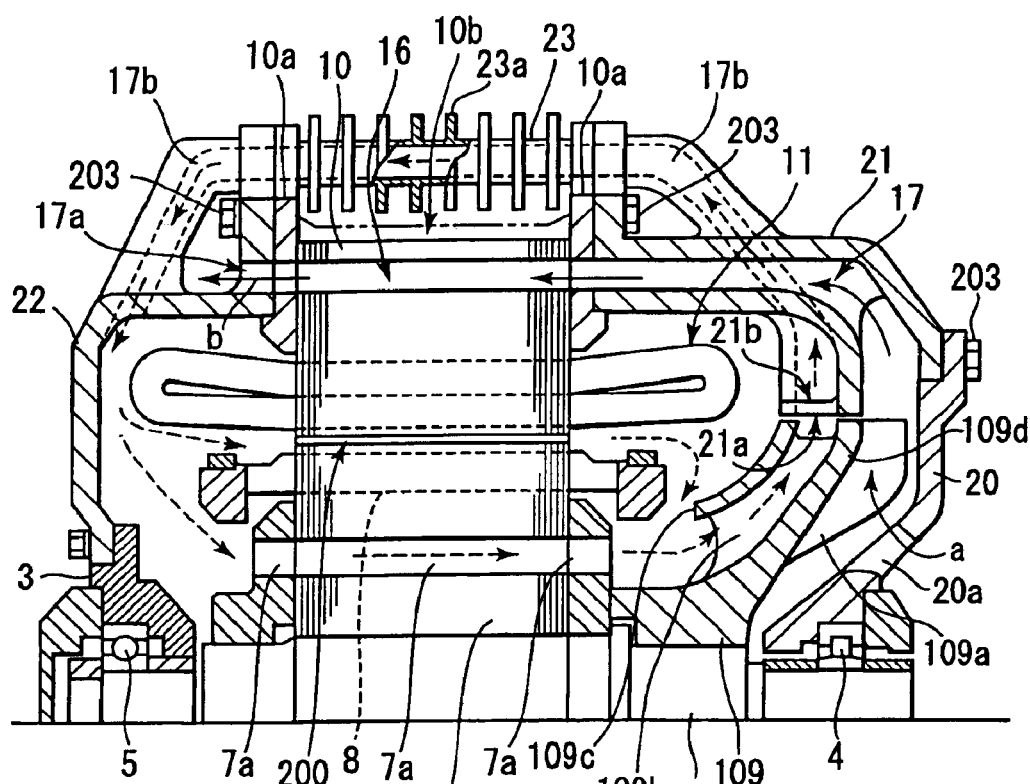
FIG. 5 is a cross-sectional view of a fully enclosed type motor with outer fans according to an embodiment of the present invention, as viewed from the lateral side.

FIG. 5 shows a fully enclosed type motor with outer fans according to an embodiment of the present invention. Core holders 10a are attached to both ends of a stator core 10. A plurality of connecting plates 10b are attached partly over the outer periphery of the stator core 10 between the core holders 10a. A number of cooling holes 16 are formed in an outer peripheral part of the stator core 10.

A ventilation fan 109 is attached to a rotor shaft 6 within the motor body. This embodiment is in contrast to the structure shown in FIG. 2 wherein the ventilation fan is attached on the outside of the bearing, that is, on the outside of the motor body.

The ventilation fan 109 is provided with blades 109a on one side, which radially extend from the rotational axis. In addition, a bracket 20 that supports a bearing 4 is provided on one side of the ventilation fan 109. A plurality of outside air inlets 20a are circumferentially formed in the bracket 20.

The bracket 20 is coupled to the core holder 10a via a connecting bracket 21. The connecting bracket 21 includes vent holes 17 communicating with the cooling holes 16 in the stator core 10. At the other end of the motor body, a housing 3 is attached to a central part of a fixed bracket 22. The fixed bracket 22 is attached to the other core holder 10a. The fixed bracket 22 also includes vent holes 17a corresponding to the cooling holes 16. The vent holes 17a are open to the outside.

An air passage including the blades 109a, cooling holes 16, vent holes 17 and vent holes 17a contributes to the cooling of a stator coil 11. Specifically, when the ventilation fan 109 is rotated by the rotation of the motor, the blades 109a function to take in cool air from the outside. The cool air comes in from a region a as indicated by the arrow, and flows through the vent holes 17, cooling holes 16 and vent holes 17a. Then, the air goes out as outside air b. Thereby, the heat of the stator coil 11 is radiated to the outside from the inner peripheral surfaces of the cooling holes 16 via the stator core 10.

On that side of the ventilation fan 109, which is opposed to the blades 109a, a number of radial blades 109b are provided. In this embodiment, an annular side plate 109c is formed to be opposed to a fan main plate 109d to which the blades 109b are attached.

A cover plate 21a is provided on the side opposed to the outer periphery of the blades 109b, so as to cover the entire periphery of the ventilation fan 109. A part of the cover plate 21a is opened to form an opening 21b.

The opening 21b communicates with a vent hole 17b formed in the connecting bracket 21. Air flowing in the vent hole 17b passes through a heat exchanger (radiator) 23 formed outside the motor body. The air from the heat exchanger 23 flows through the vent hole 17b formed in the fixed bracket 22 into the motor body. The air coming into the motor body passes through the vent hole 7a and the gap 200 between the stator core 10 and rotor core 7, and returns to the blades 109b of the ventilation fan 109. The blades 109b, external heat exchanger 23 and the opening constitute an internal circular air passage.

A number of radiation fins 23a are attached to the heat exchanger 23. Hot air sent from the blades 109b is cooled by the heat exchanger 23 and returns as cool air into the motor body. Thus, the cool air cools the rotor bars 8.

The circular air flow within the motor body is indicated by broken-line arrows. Reference numeral 203 denotes bolts.

Figure 6:
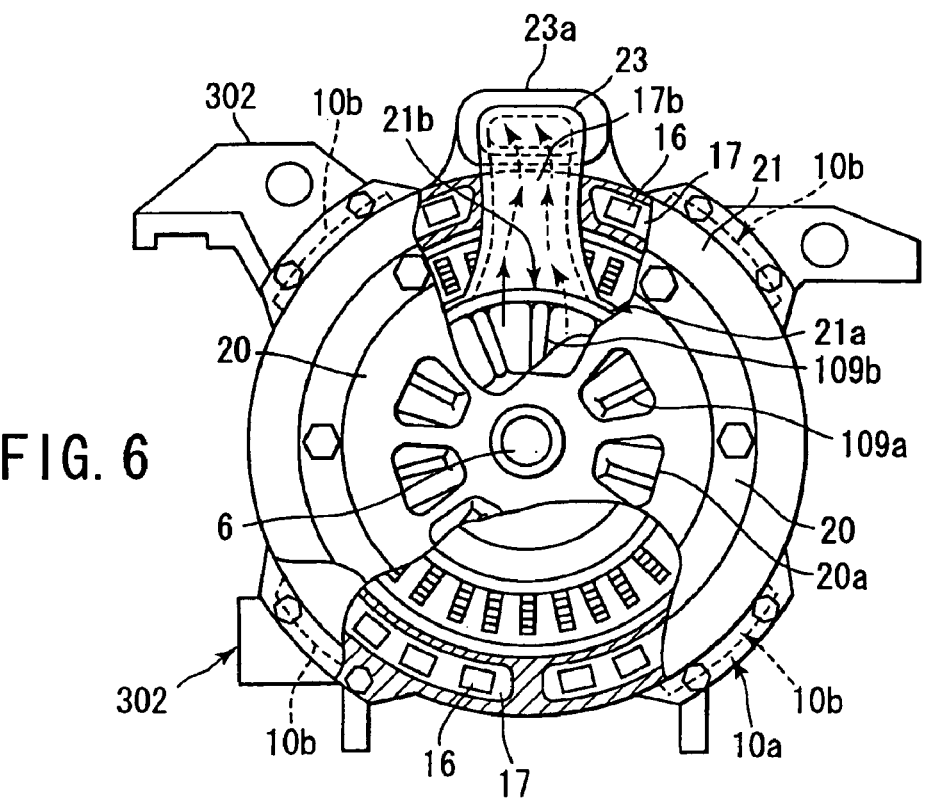
FIG. 6 is a partial cross-sectional view of the fully enclosed type motor with outer fans according to the embodiment, as viewed from the front side.

FIG. 6 is a partly cut-out cross-sectional view of the motor shown in FIG. 5, as viewed in the axial direction. In particular, FIG. 6 shows the cooling holes 16 and the circular air passage within the motor.

The cooling system of this embodiment with the above structure differs from the internal cooling system of the motor in that the blades 109a and 109b are provided on both sides of the ventilation fan 109 and thus the heat within the motor can be exchanged with outside air. That is, the motor of this embodiment has the same advantage as in the case where two heat exchangers are provided.

In general, since the ventilation fan rotates at high speed, it is formed of aluminum. The aluminum ventilation fan, which has good heat conductivity, can advantageously serve as a heat exchanger.

Figure 2:
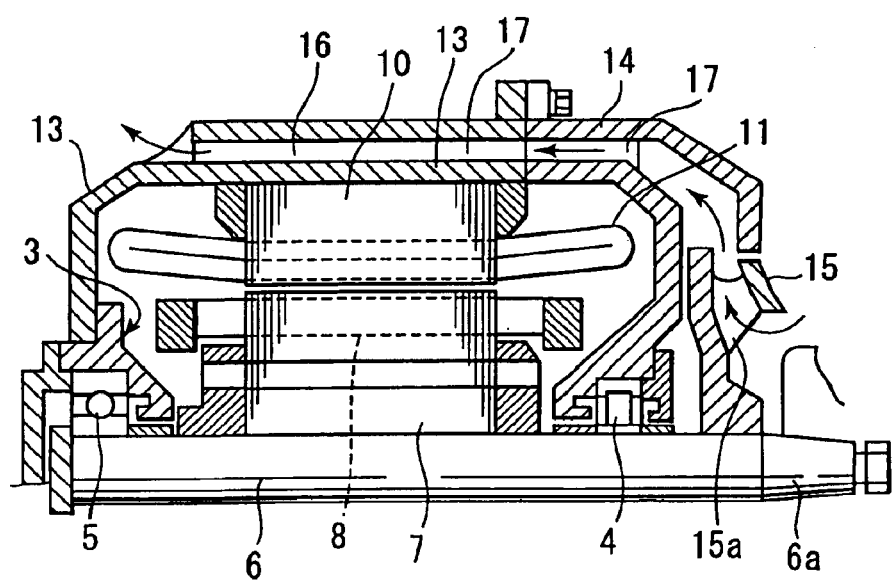
FIG. 2 is a partial cross-sectional view of an example of a conventional fully enclosed motor with outer fans, as viewed from the lateral side.
Figure 3:
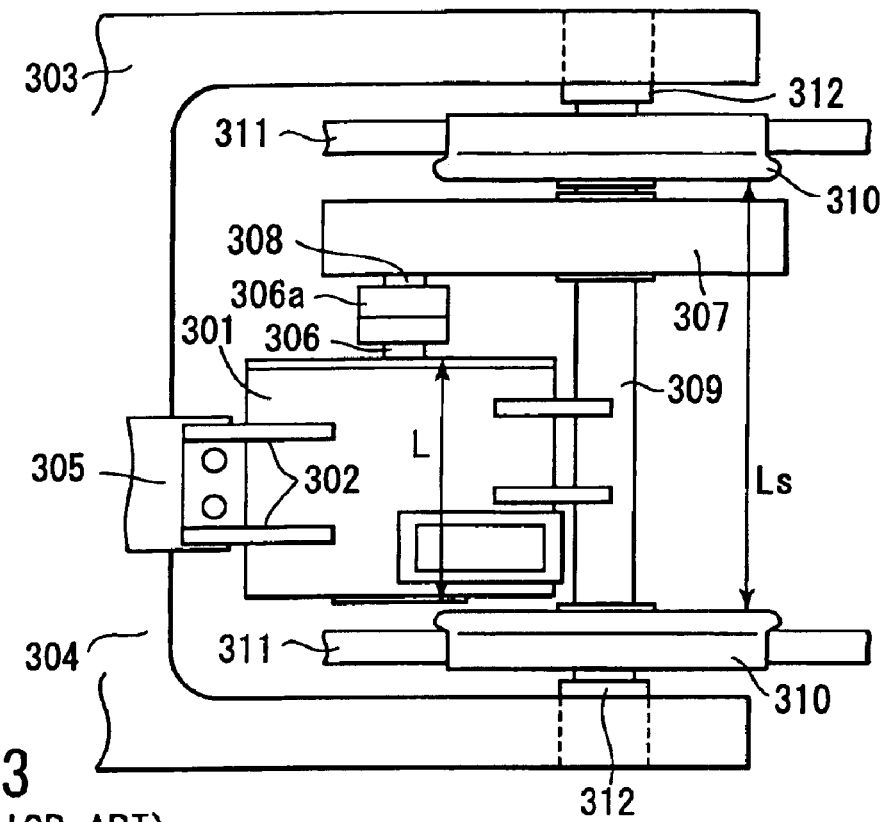
FIG. 3 is a view for explaining dimensional constraints imposed on a motor in railway-car-driving equipment mounted on a bogie.
Figure 4:
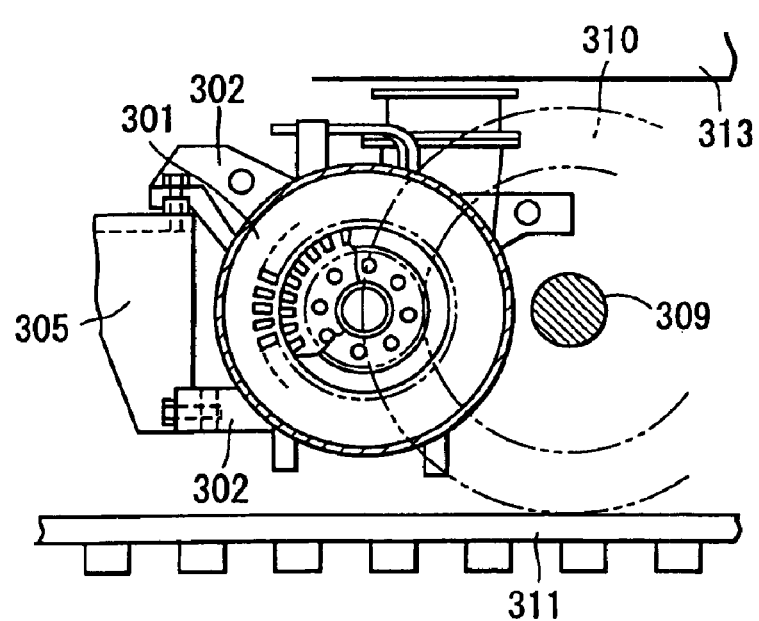
FIG. 4 is a view for explaining a power transmission method of the motor in the railway-car-driving equipment mounted provided in the car.

Further, compared to the structure shown in FIG. 2, the bearing 4 on the ventilation fan side is disposed away from the rotor core 7 and the bearing 4 is exposed to cool outside air. Therefore, the life of the grease used in the bearing 4 is elongated.

The bearing 5 on the other side is exposed to coolest air, which is cooled by the ventilation fan 109 and heat exchanger 23 and circulated in the inside of the motor. Therefore, the life of the grease used in the bearing 5 is also elongated.

Furthermore, since the number of fans is decreased, the axial dimension L of the motor can be reduced and an ideal fully enclosed type motor with outer fans for a railway car can be obtained.

Figure 1:
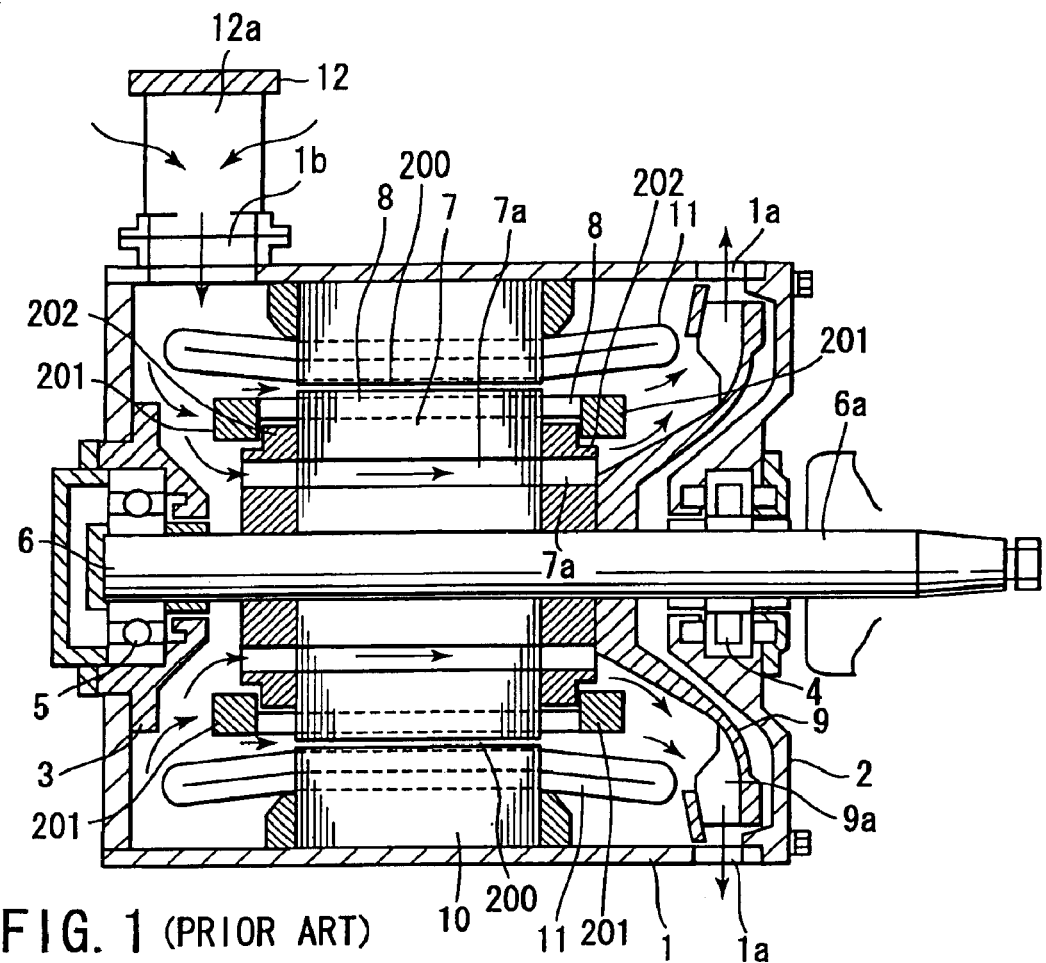
FIG. 1 is a cross-sectional view of a conventional car-driving motor, as viewed from the lateral side.

Other embodiments of the present invention will now be described with reference to FIGS. 7 to 19, with the parts common to those shown in FIGS. 1 and 2 being denoted by like reference numerals.

Figure 7:
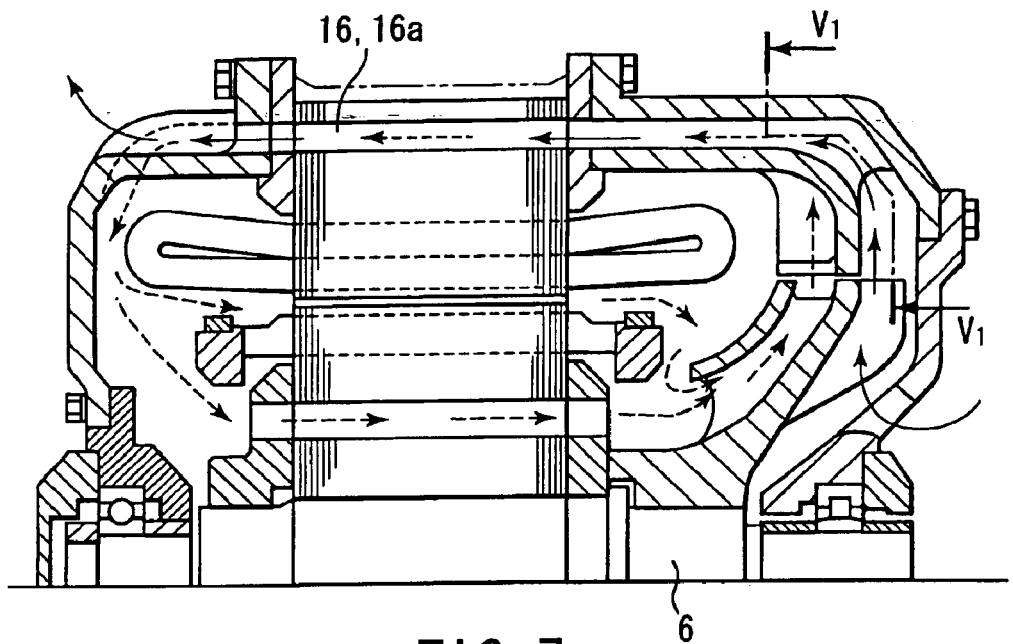
FIG. 7 is a cross-sectional view of a fully enclosed type motor with outer fans according to another embodiment of the present invention, as viewed from the lateral side.

FIG. 7 shows an embodiment wherein the heat exchanger 23 shown in FIG. 5 is not disposed on the outside of the motor body, but it is formed within the stator core 10. Although the cooling performance is lower than the structure shown in FIG. 1, the component outside the motor body is dispensed with and this structure is advantageous for the railway-car motor on which sizing constraints are imposed.

Figure 8:
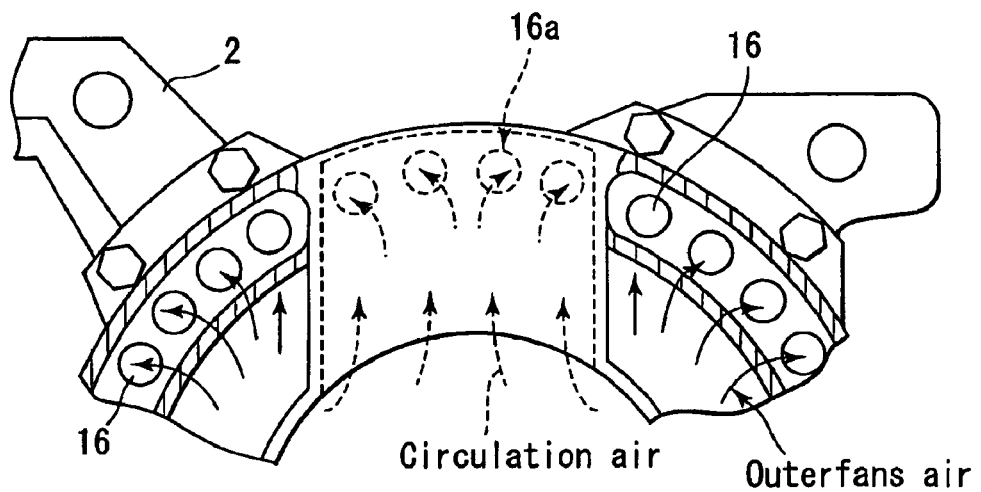
FIG. 8 is a cross-sectional view taken along line V1—V1 in FIG. 7.

FIG. 8 shows a cross-sectional structure taken along line V1—V1 in FIG. 7. FIG. 8 shows examples of outside air cooling holes 16 and intra-body circulation cooling holes 16a (i.e. cooling holes 16a for cooling by circulation of air within the motor body).

Figure 9:
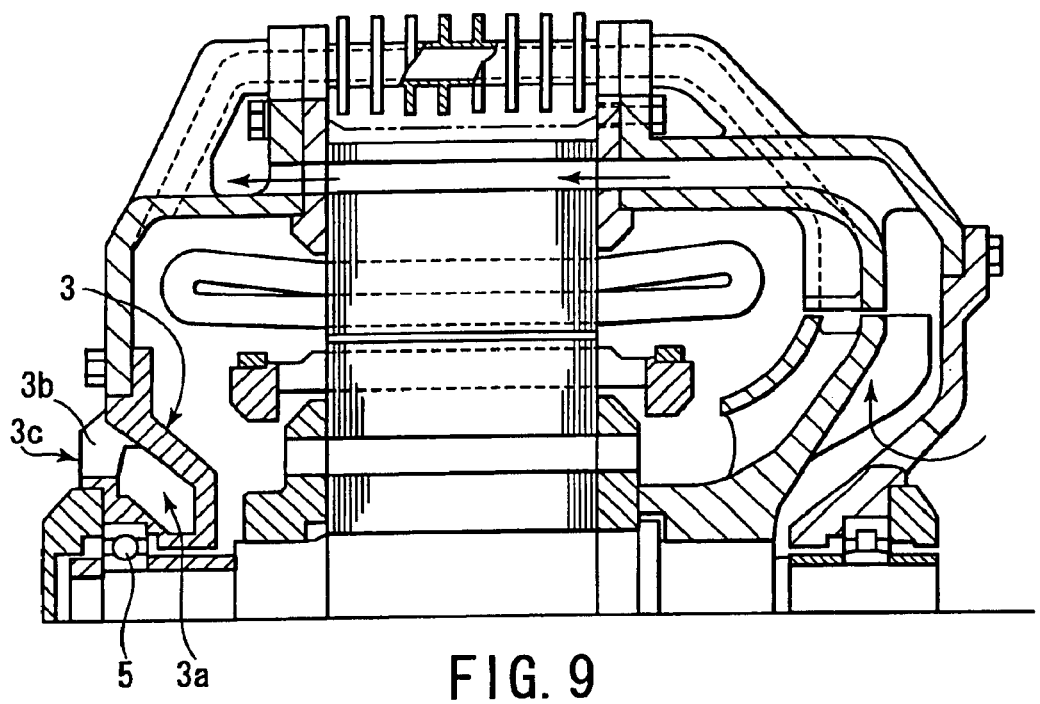
FIG. 9 is a cross-sectional view of a fully enclosed type motor with outer fans according to another embodiment of the present invention, as viewed from the lateral side.

FIG. 9 shows an embodiment aiming at enhancing the cooling performance of the bearing 5 with the structure shown in FIG. 5. For this purpose, a space 3a is defined in the housing 3 over the entire circumference. Heat within the motor body does not easily conduct to the bearing 5 and its lubrication grease. The heat insulating effect of air is utilized. The space 3a communicates with the outside, and cool air enters the space 3a. Thus, the cooling performance is further enhanced.

A plurality of ribs 3c are formed between adjacent holes 3b that communicate with outside air. The ribs 3c function as reinforcement members supporting the rotor and as fins for facilitating radiation.

Figure 10:
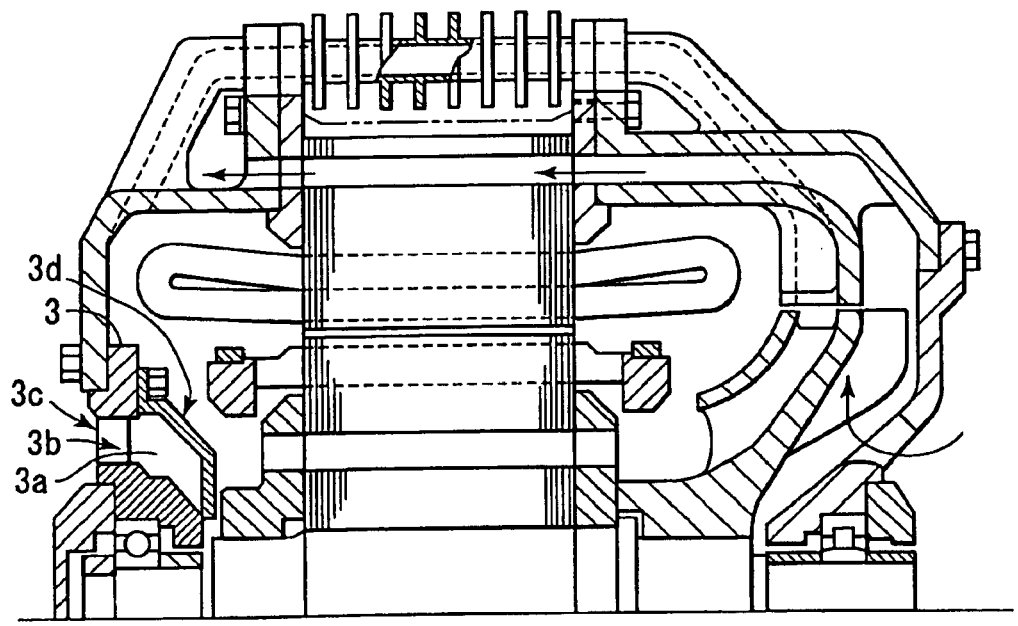
FIG. 10 is a cross-sectional view of a fully enclosed type-motor with outer fans according to another embodiment of the present invention, as viewed from the lateral side.

FIG. 10 shows an embodiment that is a modification of the structure shown in FIG. 9. The space 3a defined in the housing 3 is formed by attaching a cylindrical cover 3d by means of a bolt. This structure enhances working efficiency, compared to the structure shown in FIG. 9.

Figure 11:
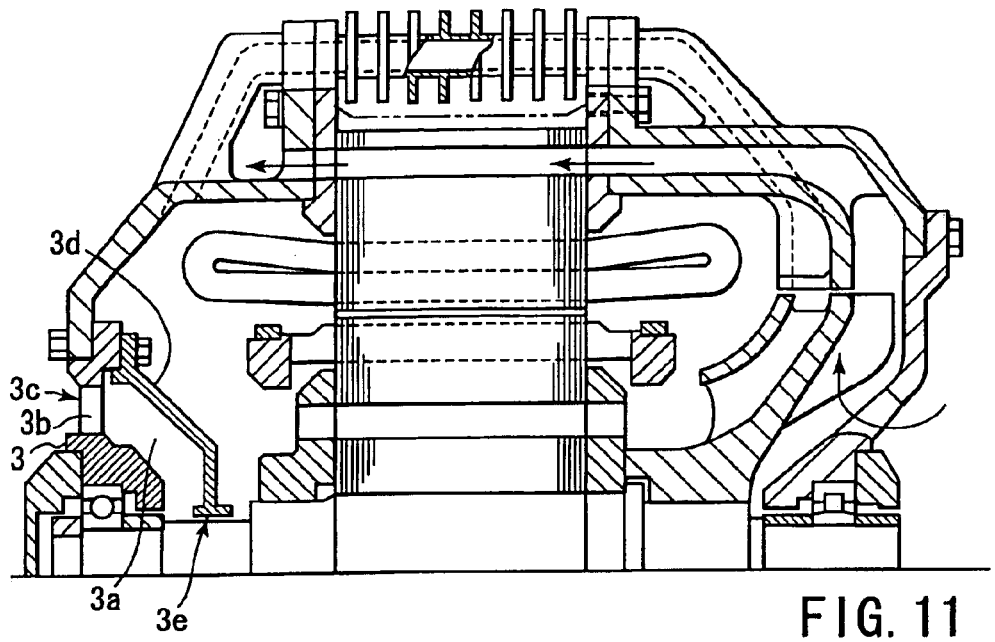
FIG. 11 is a cross-sectional view of a fully enclosed type motor with outer fans according to another embodiment of the present invention, as viewed from the lateral side.

FIG. 11 shows an embodiment wherein the cylindrical cover 3d shown in FIG. 10 is opposed to the rotor, with a labyrinth 3e (small gap) being provided. This structure can increase the size of the space 3a.

Figures 12A, 12B:
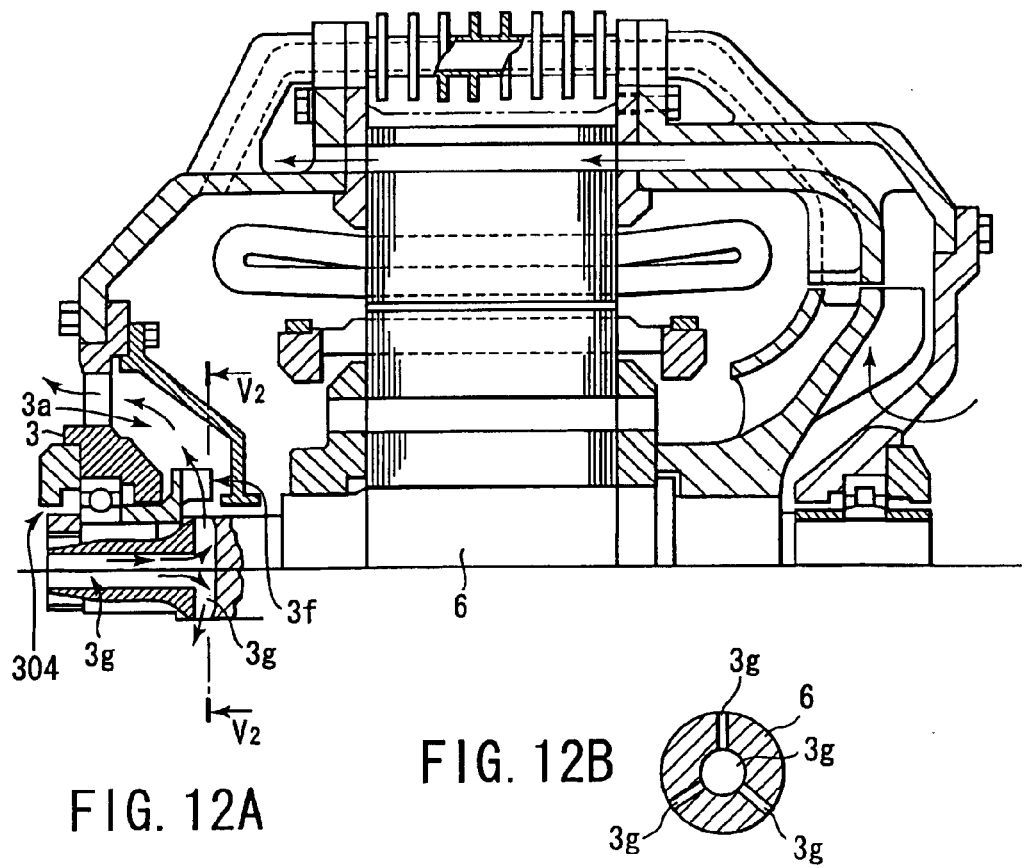
FIG. 12A is a cross-sectional view of a fully enclosed type motor with outer fans according to another embodiment of the present invention, as viewed from the lateral side.
FIG. 12B is a cross-sectional view taken along line V2—V2 in FIG. 12A.

FIG. 12A shows an embodiment aiming at positively passing outside air in the structure shown in FIG. 11. A fan 3f is attached to that part of the rotor shaft 6, which is located within the space 3a. Vent holes 3g communicating with the outside are formed in the rotor shaft 6 that is exposed to the space 3a. Reference numeral 304 denotes a labyrinth. With this structure, if the rotor shaft 6 is rotated, the fan 3f rotates accordingly. Outside air flows, as indicated by the arrows, and the cooling performance for the bearing 5 and grease is further enhanced.

FIG. 12B shows radially extending portions of the vent holes 3g, which are formed equidistantly at three locations in the circumferential direction.

Figure 13:
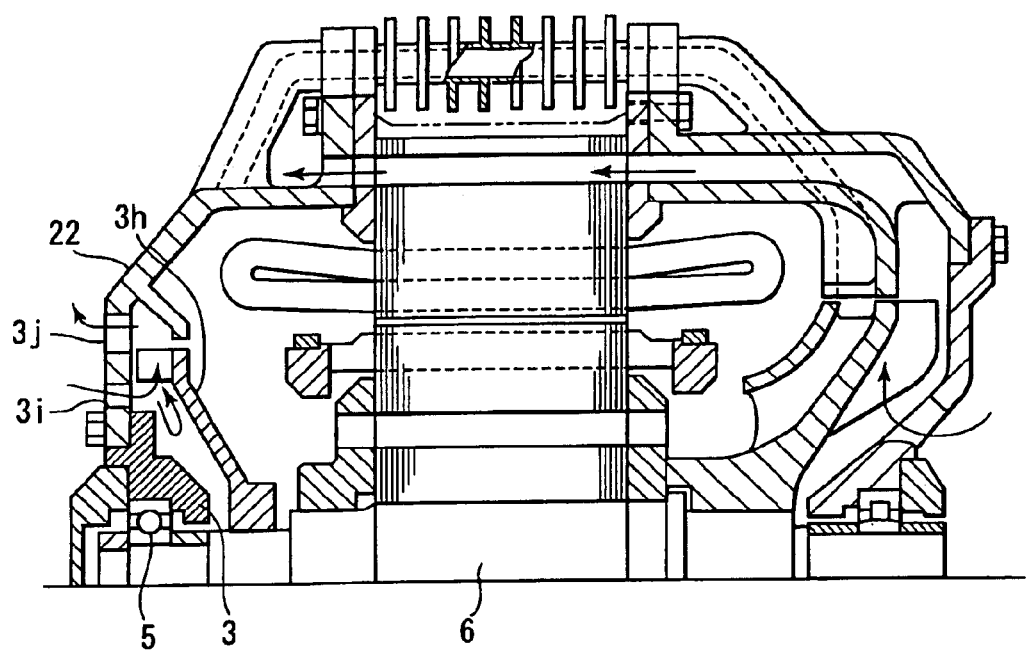
FIG. 13 shows a fully enclosed type motor with outer fans according to another embodiment of the present invention, illustrating in detail the form of a vent hole.

FIG. 13 shows a modification of the structure of FIG. 12A, aiming at positively feeding outside air into the motor body. A region is defined by a fan 3h attached to, e.g. the rotor shaft 6, the fixed bracket 22 and the housing 3. In the region, an air intake 3i and an air outlet 3j are formed. With this structure, if the rotor is rotated, the fan 3h rotates accordingly. Outside cool air flows, as indicated by the arrows, and prevents heat conduction and heat radiation of the bearing 5 and lubrication grease in the housing 3 due to the rise in temperature within the motor body. Thus, the cooling effect is exhibited. Although the air intake 3i and air outlet 3j are formed in the fixed bracket 22, they may be provided anywhere if the function of housing 6, etc. is maintained.

Figure 14:
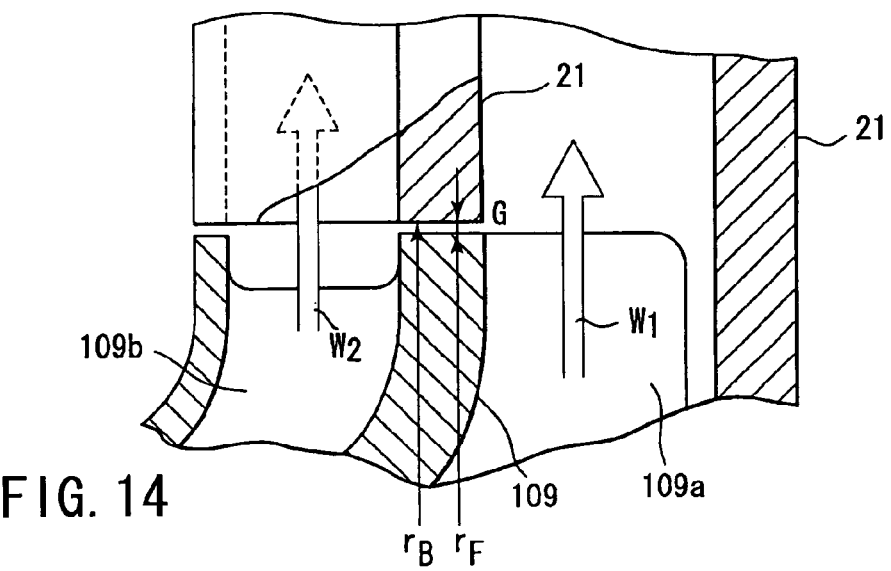
FIG. 14 shows a fully enclosed type motor with outer fans according to another embodiment of the present invention, illustrating a boundary between a connecting bracket (fixed member) and a fan (rotary member)

FIG. 14 shows a boundary area between the ventilation fan 109 and connecting bracket 21 in FIG. 5, that is, between the rotor section and the stator section. Normally, a small gap is provided therebetween. The blades 109a of the ventilation fan 109 cools the stator core 10 by feeding outside air W1. On the other hand, the blades 109b feeds air within the motor body to the heat exchanger 23, thereby cooling the air within the motor body and returns circulation air W2 into the motor body. The air W1 and air W2 are independent of each other and have to be prevented from mixing.

Normally, this is realized by the small gap G. The gap G prevents the independent air W1 and W2 from entering each other's vent hole. However, in case where the ventilation fan 109 is formed of, e.g. aluminum with high heat conductivity, the following phenomenon occurs in relation to the bracket 21 that is normally formed of iron. That is, the small gap G designed at the time of manufacture changes due to a difference in thermal expansion amount between the materials of the ventilation fan 109 and connecting bracket 21 which are heated in accordance with a rise in temperature within the motor body. Specifically, the outside diameter $r_F$ of the ventilation fan 109 expands to a greater degree than the inside diameter $r_B$ of the connecting bracket 21.

As a result, the small gap G becomes less than the design value. If the temperature further rises, a problem of mutual contact occurs. To prevent this, the small gap G has to be designed in accordance with the thermal expansion amount at the time of the highest temperature. On the other hand, in the cool state, the small gap G has to be designed to be greater than the normal design value. As a consequence of the increase in the small gap G, the independent air W1 and air W2 may mix.

Figure 15:
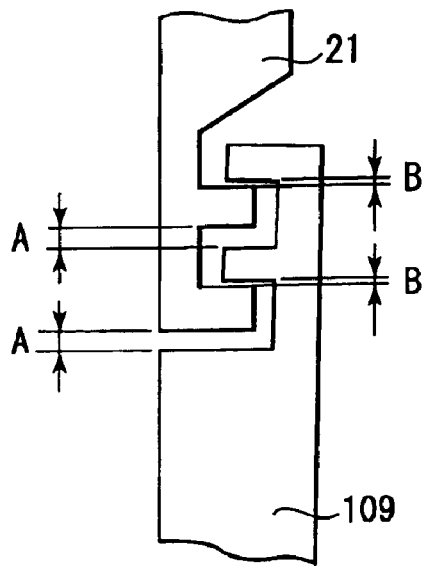
FIG. 15 shows a fully enclosed type motor with outer fans according to another embodiment of the present invention, illustrating a boundary between the connecting bracket and the fan in a cooled state.
Figure 16:
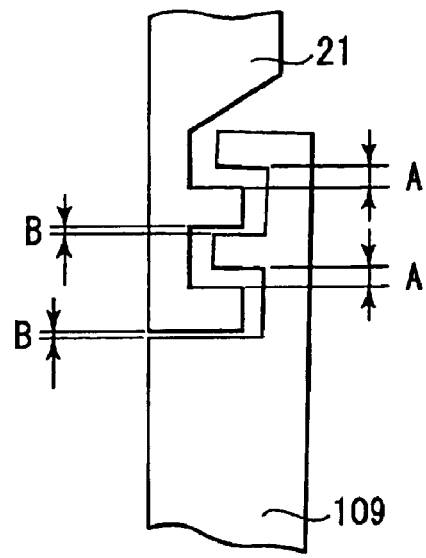
FIG. 16 shows a fully enclosed type motor with outer fans according to another embodiment of the present invention, illustrating a boundary between the connecting bracket and the fan in a heated state.

FIG. 15 and FIG. 16 show an embodiment of the structure for preventing the increase in the small gap G. FIG. 15 shows a structure of multi-stage small gap G at the time of design. A gap B is set at a small value in accordance with the design value, while a gap A is set at a large value. If the amount of heat of the motor increases and the ventilation fan 109 and connecting bracket 21 take maximum temperatures, a thermal expansion difference AR occurs. This state is illustrated in FIG. 16.

The gap B in FIG. 15 increases up to A, while the gap A decreases to B. Thus, whether the motor is cooled or heated up to a maximum temperature, the small gap G can keep a constant inter-wall space so as to prevent mixing of air W1 and air W2.

Figure 17:
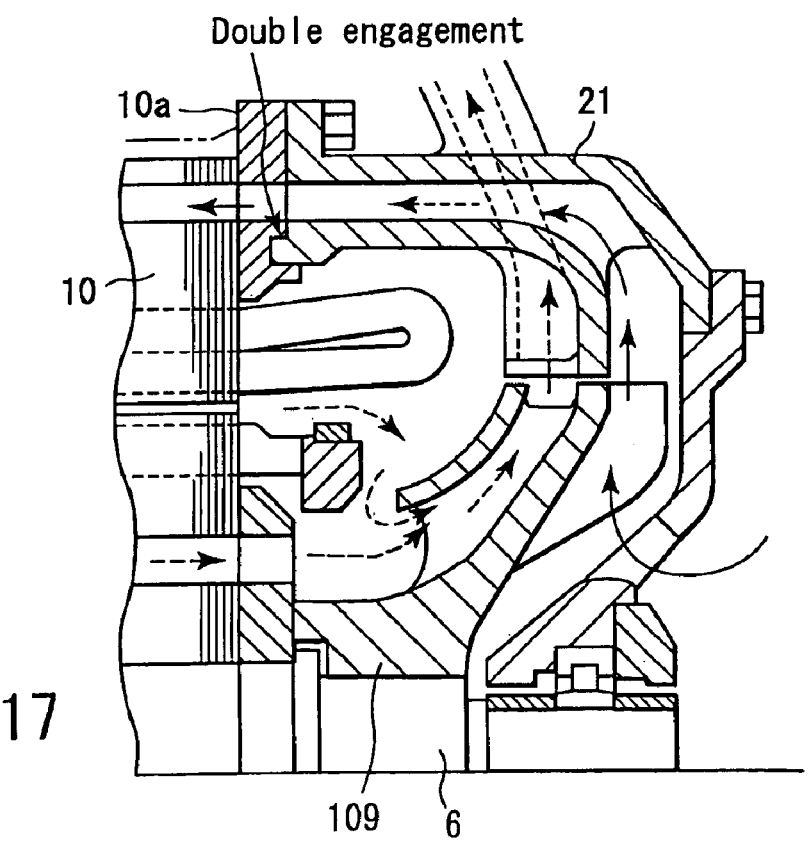
FIG. 17 shows a fully enclosed type motor with outer fans according to another embodiment of the present invention, illustrating an example of a measure to deal with heat.

The countermeasure to be taken in the case where the ventilation fan 109 is formed of, e.g. aluminum with high heat conductivity has been described above. Another countermeasure is to similarly form the connecting bracket 21 of aluminum. In this case, for example, a double engagement structure, as shown in FIG. 17, may be adopted for the coupling between the connecting bracket 21 and the core holder 10a integrally formed with the stator core 10. By virtue of the double engagement structure, even when the connecting bracket 21 is thermally expanded, the holding force of the core holder 10a forcibly holds the connecting bracket 21, thus preventing misalignment between the connecting bracket 21 and core holder 10a.

Figure 18:
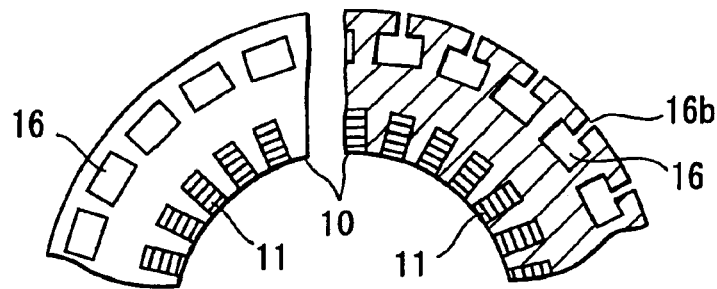
FIG. 18 shows a fully enclosed type motor with outer fans according to another embodiment of the present invention, illustrating an example of cooling holes in the stator core.
Figure 19:
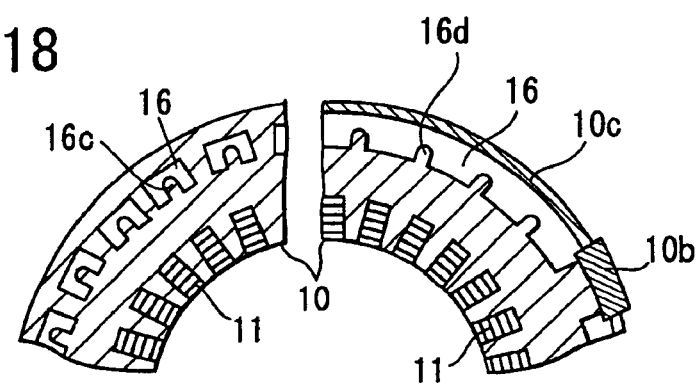
FIG. 19 shows a fully enclosed type motor with outer fans according to another embodiment of the present invention, illustrating another example of cooling holes in the stator core.

FIG. 18 and FIG. 19 show modifications of the cooling holes 16 in the stator core 10. A left-hand part of FIG. 18 shows rectangular cooling holes 16.

A right-hand part of FIG. 18 shows cooling holes 16, each of which is partly exposed to the outside. A left-hand part of FIG. 19 shows cooling holes 16 each having a projection 16c therein. In a right-hand part of FIG. 19, a cooling hole 16 is defined by the connecting plate 10b, stator core 10 and cover 10c. The stator core 10 has projections 16d. The cooling holes may have any shape, if cooling air for cooling the stator core 10 can pass through.

In the embodiments of the present invention, the frameless structure represented by the structure shown in FIG. 5 is adopted. However, the motor with the frame as shown in FIG. 2 is applicable to the invention. The heat exchanger 23 is provided outside the motor body. The motor body, in this context, is composed of the bracket 21 in the case of the frameless motor shown in FIG. 5, or it is composed of the frame 13 in the case of the framed motor shown in FIG. 2.

The above-described motors are of induction type. However, this invention is applicable to any type of motor, for example, synchronous motors.

Either the blades 109a or the blades 109b of the ventilation fan 109 may be formed equidistantly or non-equidistantly. The number of blades 109a and the number of blades 109b may be different, and blades with different diameters may be combined. In general, if the number of blades 109a and the number of blades 109b are made different or the blades are arranged with different pitches, the wind-noise sound pressure decreases and the noise is diminished.

Figure 20:
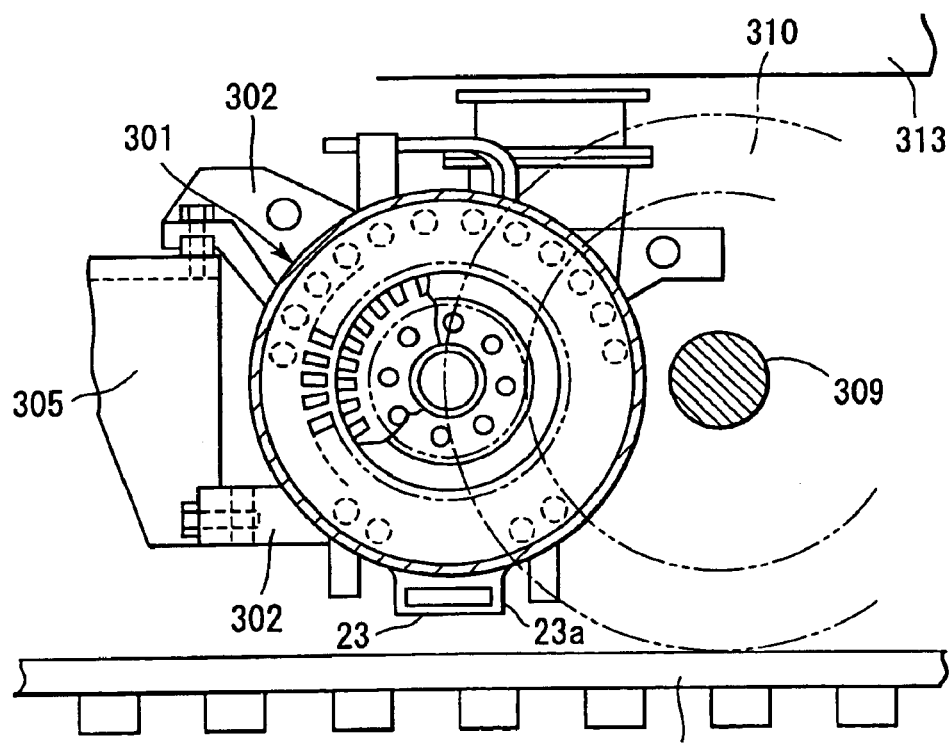
FIG. 20 shows a fully enclosed type motor with outer fans according to another embodiment of the present invention, illustrating a relationship between a motor, a heat exchanger, fins and rails.

The heat exchanger 23 shown in FIG. 6 is formed on top of the motor. In the case of a railway car, as shown in FIG. 20, a motor 301' is disposed under the floor of the car body 313. Thus, while the car is running, the motor 301' exposes itself to more wind when it is disposed near the rails 311 than when it is disposed just under the body 313. It is thus more desirable to dispose the heat exchanger 23 on the lower side of the motor facing the rails 311 than to dispose it on top of the motor. In addition, the cooling performance is enhanced by arranging the fins 23a of the heat exchanger 23 in parallel with the direction of running of the car.

Figures 21, 22A, 22B:
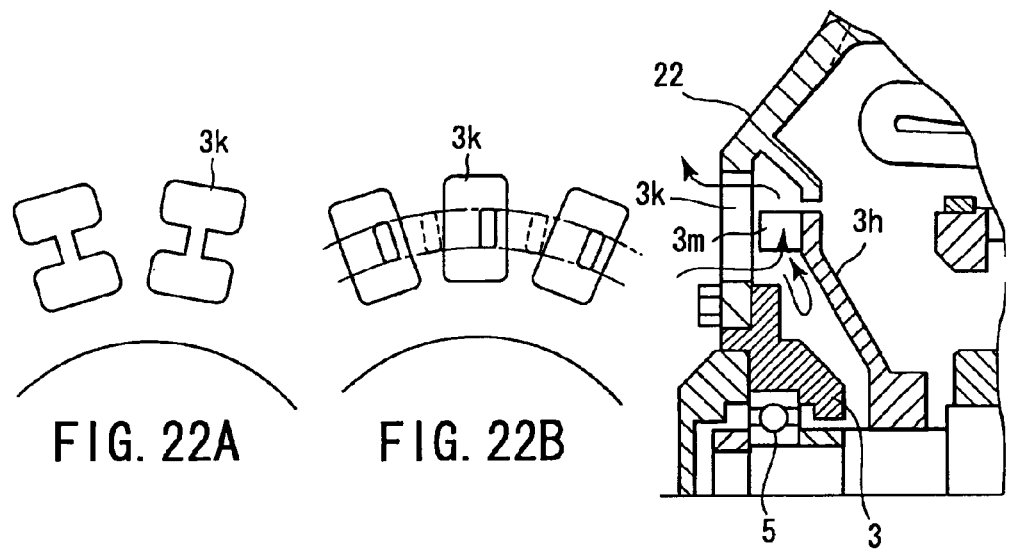
FIG. 21 shows a fully enclosed type motor with outer fans according to another embodiment of the present invention, illustrating examples of an air intake and an air outlet.
FIGS. 22A and 22B show fully enclosed type motors with outer fans according to other embodiments of the present invention, illustrating examples of the air intake and air outlet.

FIG. 21 shows a modification of the structure of FIG. 13. In FIG. 21, a vent hole 3k is formed by combining the air intake 3i and air outlet 3j. Cooling air flows, as indicated by the arrows, and the same effect as with the structure shown in FIG. 13 is obtained.

FIG. 22A shows the structure of FIG. 21, as viewed from the axially left-hand side. The air intake 3i and air outlet 3j are formed as the single vent hole 3k. With this single vent hole 3k, the opening for outside air is increased and the cooling performance is enhanced.

Similarly, FIG. 22B shows the structure of FIG. 21, as viewed from the axially left-hand side. The vent hole 3k shown in FIG. 21 has a waist portion at a radially middle position. Thus, the opening for outside air is increased, and a safety measure is taken to prevent blades 3m of the rotary fan 3h from being touched from the outside.

Figures 23, 24:
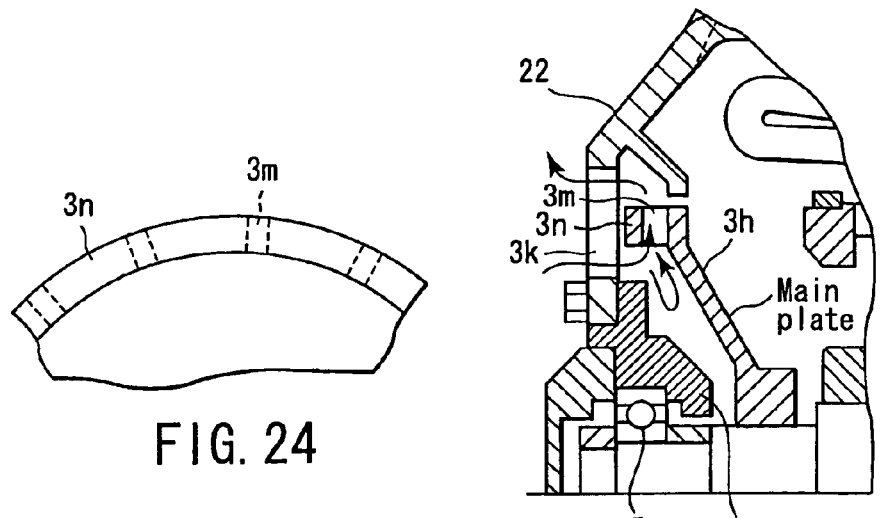
FIG. 23 shows a fully enclosed type motor with outer fans according to another embodiment of the present invention, illustrating examples of an air intake and an air outlet.
FIG. 24 shows a fully enclosed type motor with outer fans according to another embodiment of the present invention, illustrating examples of an air intake and an air outlet.

FIG. 23 shows a modification of the structure shown in FIG. 22B, for which the safety measure is taken. Although the vent hole 3k has no waist portion, an annular side plate 3n is formed to be opposed to the main plate of the blades 3m of the fan 3h. Thus, the projection of the blade 3m is prevented from being exposed.

FIG. 24 shows a modification of the structure of FIG. 21. The side plate 3n and blades 3m of the fan 3h in FIG. 23 are viewed from the axially lateral side.

Figure 25:
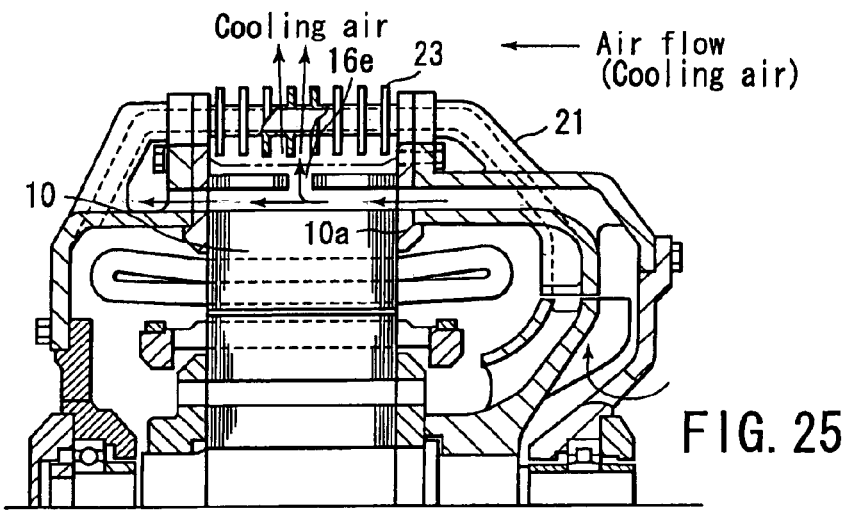
FIG. 25 shows a fully enclosed type motor with outer fans according to another embodiment of the present invention, illustrating an example of the opening.

FIG. 25 shows an embodiment wherein an opening 16e, like the opening 16b in FIG. 18, is formed near the heat exchanger 23. An air flow is produced on the outside of the heat exchanger 23, and the radiation effect of the heat exchanger 23 with outside air is enhanced. In FIG. 25, the opening 16e is provided at a substantially middle part of the stator core 10. However, if the opening 16e is provided at a right end of the stator core 10 in FIG. 25, non-heated cool air, which has just entered the stator core 10, is discharged from the opening 16e. Therefore, the radiation effect of the heat exchanger 23 is further enhanced.

Figure 26:
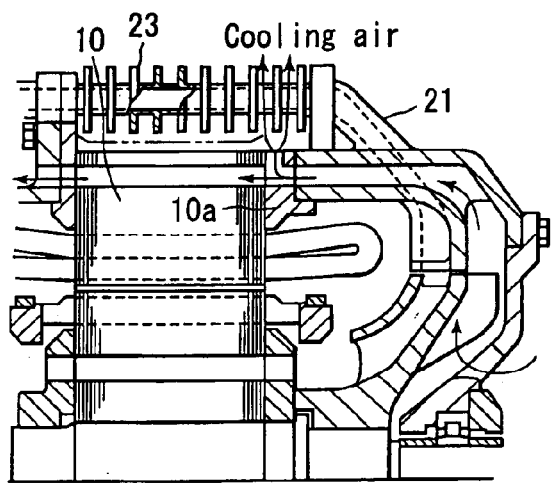
FIG. 26 shows a fully enclosed type motor with outer fans according to another embodiment of the present invention, illustrating another example of the opening.

FIG. 26 shows a modification of the structure shown in FIG. 25. In this modification, the opening 16e is formed in the core holder 10a.

Figure 27:
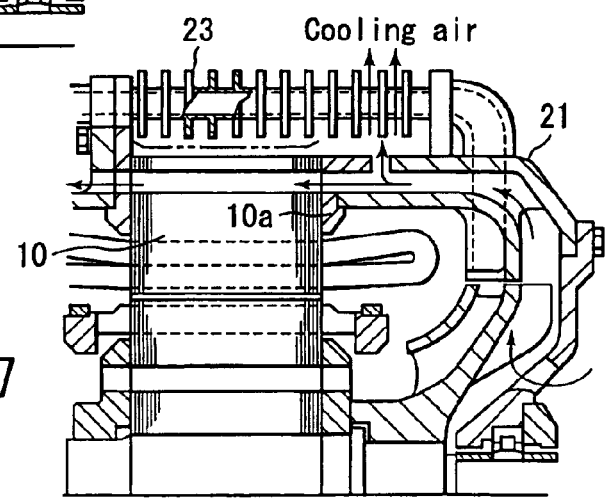
FIG. 27 shows a fully enclosed type motor with outer fans according to another embodiment of the present invention, illustrating another example of the opening.

FIG. 27 also shows a modification of the structure shown in FIG. 25. In this modification, the opening 16e is formed in the connecting bracket 21.

Figure 28A:
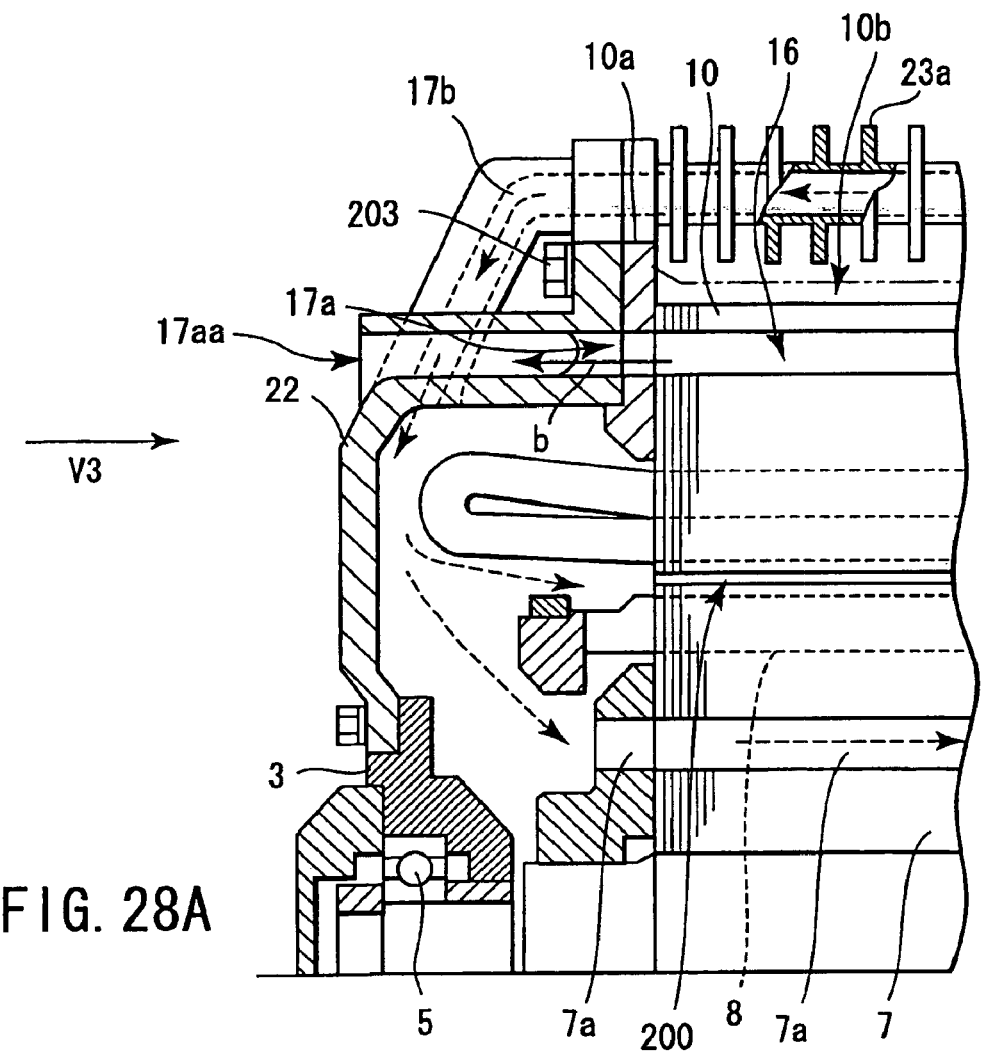
FIG. 28A is a cross-sectional view of a fully enclosed type motor with outer fans according to another embodiment of the present invention, as viewed from the lateral side.
Figure 28B:
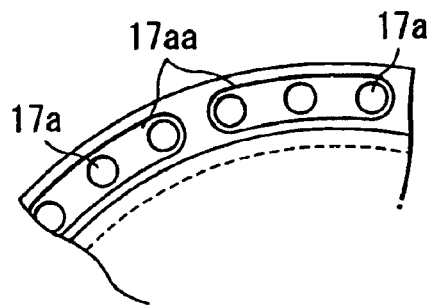
FIG. 28B is a cross-sectional view taken along line V3—V3 in FIG. 28A.

FIG. 28A shows a modification of the structure of FIG. 5. Cool air discharged from the cooling hole 16 flows through the vent hole 17a corresponding to the cooling hole 16. The air is then discharged from a vent hole 17aa, which is defined by combining some vent holes 17a (e.g. three vent holes 17a are combined into a single vent hole 17aa, as shown in FIG. 28B).

With this structure, cooling air is discharged through the vent hole with a gradually increasing cross section. A sudden change in pressure does not occur, and a ventilation loss can be reduced by a defuser effect. Moreover, a low-noise air discharge structure is provided.

Figure 29A:
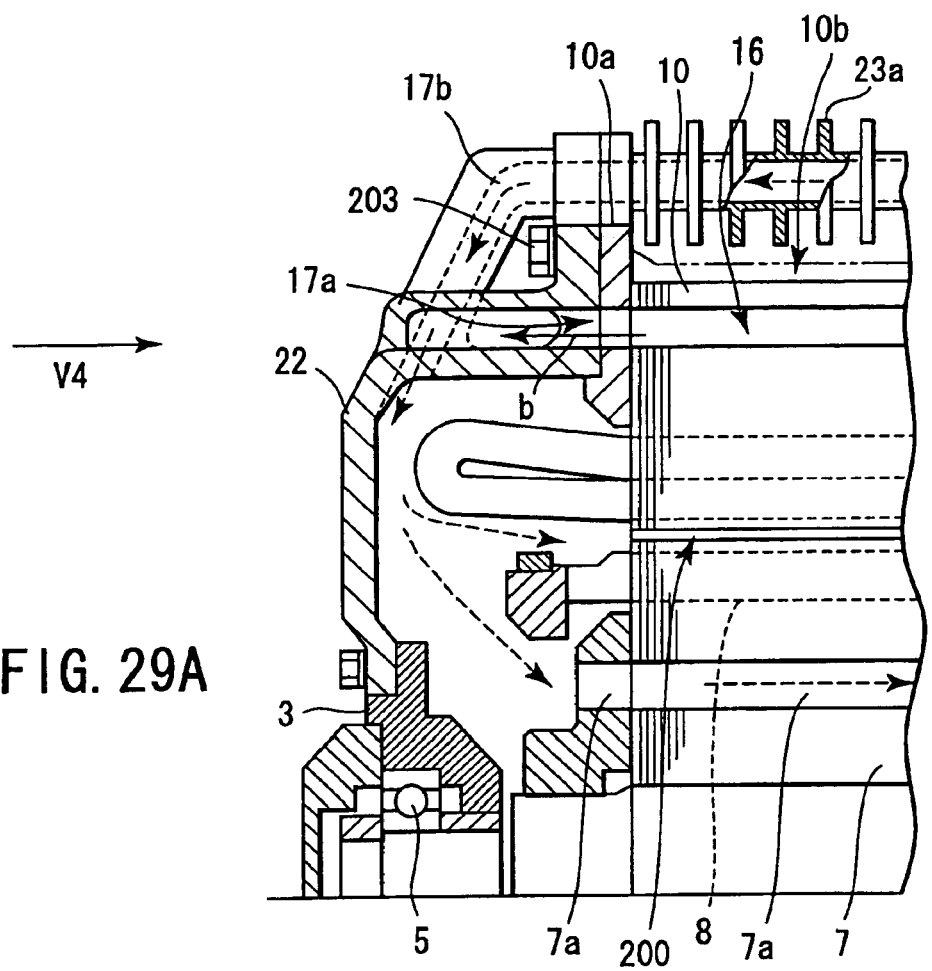
FIG. 29A is a cross-sectional view of a fully enclosed type motor with outer fans according to another embodiment of the present invention, as viewed from the lateral side.
Figure 29B:
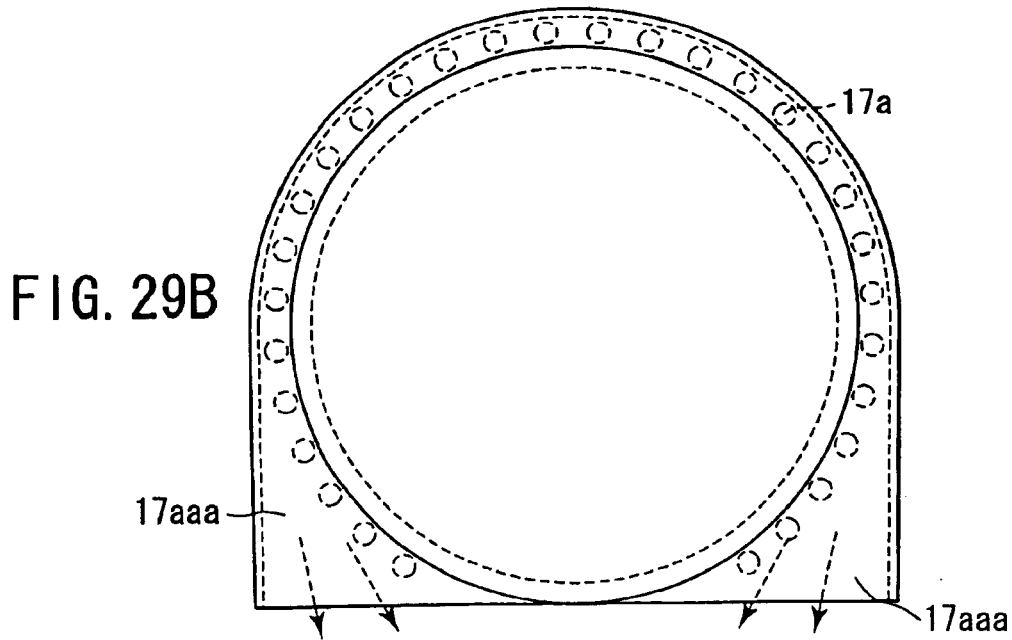
FIG. 29B is a cross-sectional view taken along line V4—V4 in FIG. 29A.

FIG. 29A and FIG. 29B show an embodiment wherein all discharge vent holes 17aaa are configured such that the air, when discharged, is directed downward from the rotational-axis direction. With this structure, the noise reduction effect is further enhanced.

Figure 30:
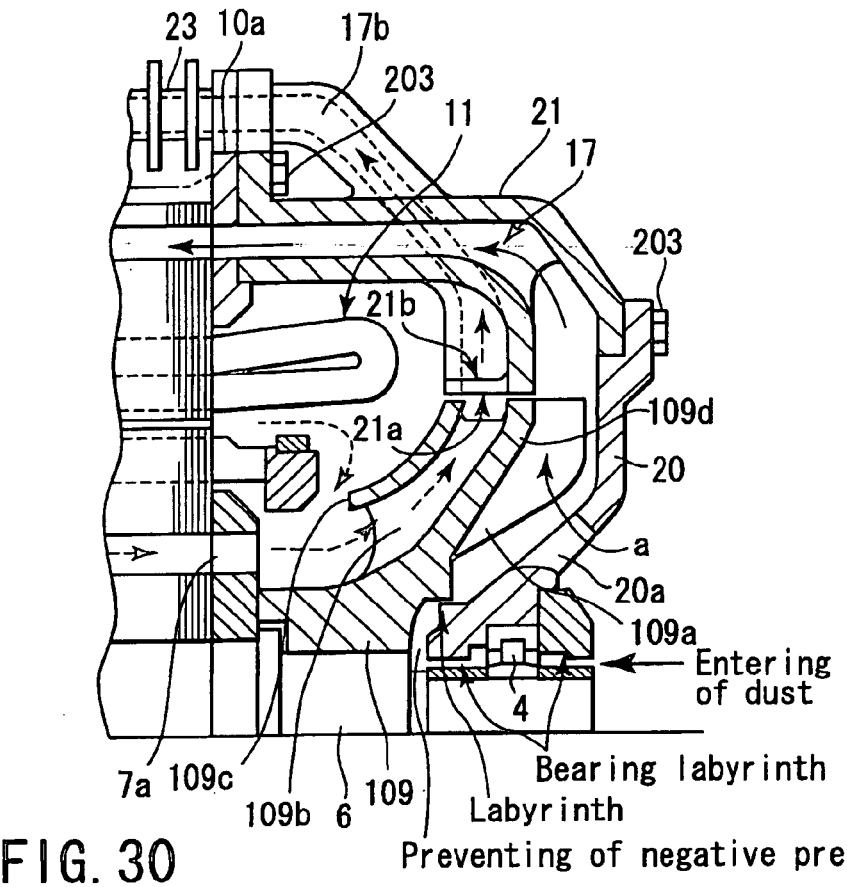
FIG. 30 shows a fully enclosed type motor with outer fans according to another embodiment of the present invention.

FIG. 30 shows an embodiment wherein a labyrinth structure is provided between the ventilation fan 109 and bracket 20. This prevents the core-side region (ventilation fan 109 side region) of the bearing 4 from having a negative pressure due to the cooling air sucked form the location a. If the core-side region (ventilation fan 109 side region) of the bearing 4 has a negative pressure, an air stream flowing from the outside into the inside occurs at the bearing labyrinth portion located between the inner side and outer side of the bearing 4. This increases the possibility that outside dust may enter the bearing from the region indicated by the arrow.

Figure 31:
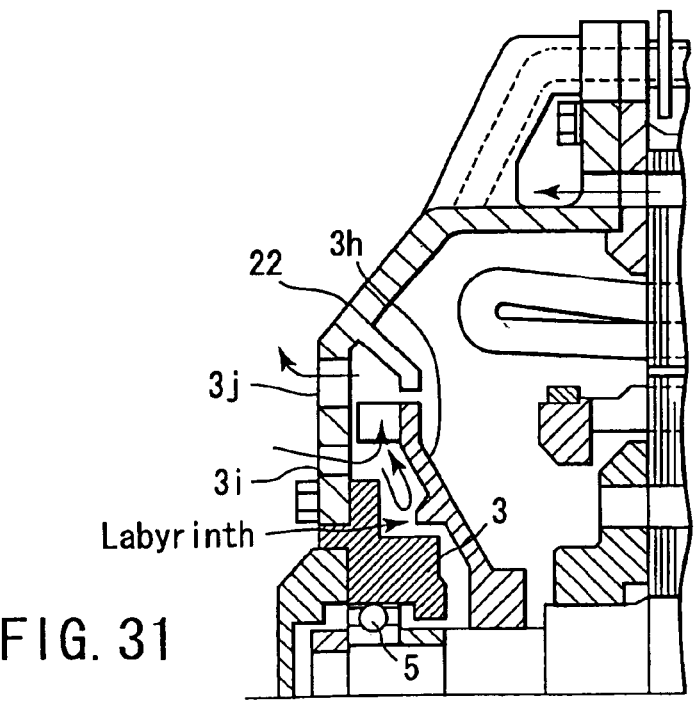
FIG. 31 shows a fully enclosed type motor with outer fans according to another embodiment of the present invention.

FIG. 31 shows an embodiment wherein a labyrinth structure is provided between the non-drive-side fan 3h and the housing 3. The labyrinth structure is made more effected than the structure shown in FIG. 9.

FIG. 32A and FIG. 32B show an embodiment wherein, aside from the blades 109a of ventilation fan 109 shown in FIG. 5, each having a length $l_1$ in the rotational-axis direction, additional blades 109a each having a less length $l_2$ are provided. The amount of air flow from the region a is decreased while the heat exchange function of the main plate 109d of ventilation fan 109 is ensured. With this structure, the amount of air flow can be decreased while the cooling performance is maintained, and noise reduction can be realized.

FIG. 33A and FIG. 33B show an embodiment aiming at achieving the same advantageous effect as the structure shown in FIGS. 32A and 32B. In this embodiment, projections 109a' and 109b' are formed in between the blades 109a and 109b of the ventilation fan 109. The heat-exchange function of the main plate 109d is further enhanced. These projections can freely be designed, for example, such that they are not provided in between the blades 109a but are provided in between the blades 109b.

Figure 34:
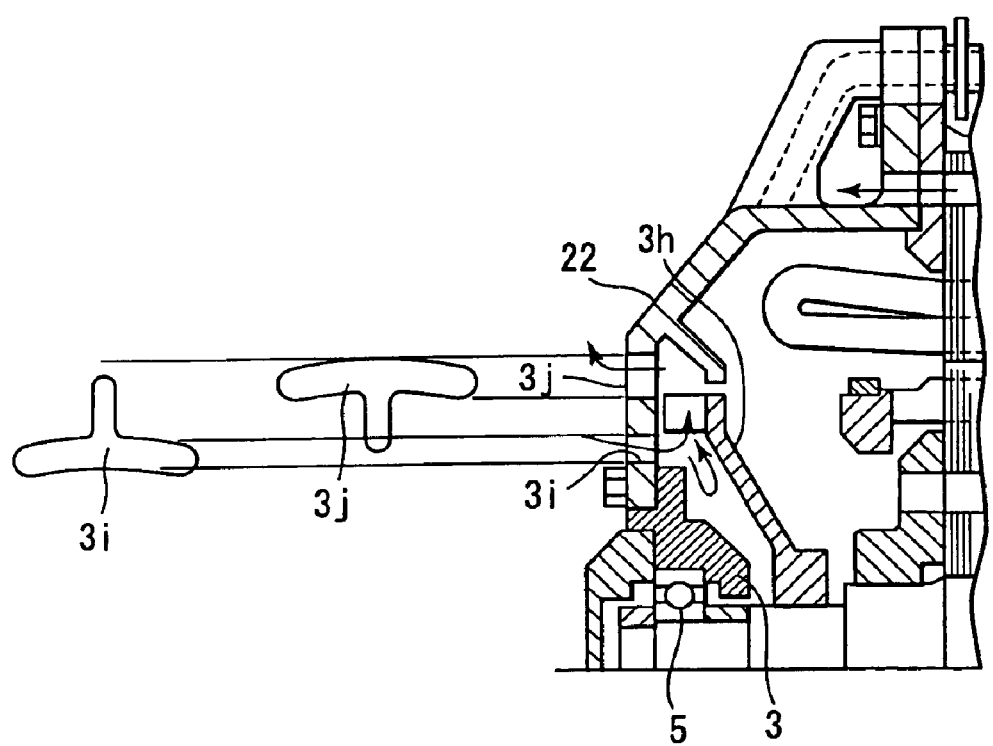
FIG. 34 shows a fully enclosed type motor with outer fans according to another embodiment of the present invention.

FIG. 34 shows one of modifications of the structure of FIG. 13. A part of the air intake 3i is radially extended up to the air outlet 3j, and a part of the air outlet 3j is radially extended down to the air intake 3i. With this structure, too, the same advantageous effect as the structure shown in FIG. 13 can be obtained.

As has been described above, the present invention can provide a fully enclosed type motor with outer fans, which is ideal as a driving motor for a railway car, wherein heat generation of rotor bars within the motor body is suppressed, heat conduction to bearings is suppressed, and the life of the bearings and grease is not decreased.

What is claimed is:

1. A fully enclosed type motor with outer fans, comprising:

a stator core;

a rotor core disposed on an inner peripheral side of the stator core;

a first bearing provided at one end of the stator core via a bracket;

a second bearing provided at the other end of the stator core via a housing that is attached to the bracket by means of a fixing member;

a rotor shaft to which the rotor core is attached, the rotor shaft being rotatably supported by the first and second bearings;

a ventilation passage formed in an outer peripheral part of the stator core;

an external heat exchanger;

first and second blades provided on the rotor shaft;

an air passage including the first blades, an opening formed in the bracket, and a cooling hole formed in the outer peripheral part of the stator core; and an internal circulation air passage including the second blades and the external heat exchanger.

2. The fully enclosed type motor with outer fans, according to claim 1, wherein a space communicating with outside air is provided at the housing in a vicinity of the bearing.

3. The fully enclosed type motor with outer fans, according to claim 1, wherein a space is provided at the housing in a vicinity of the bearing by a member that is different from the housing and is detachably attached to the housing as a cover-like member.

4. The fully enclosed type motor with outer fans, according to claim 1, wherein a fan having blades on the bearing side is provided on a rotary member including at least a rotor, a region is formed to be surrounded by a main plate of the fan, at least the bracket or a frame, and the housing, an air inlet is formed at a portion having a less radial distance than the blades, an air outlet is formed at a portion having a greater radial distance than the blades, and outside air is introduced in and exhausted from the surrounded region.

5. The fully enclosed type motor with outer fans, according to claim 1, wherein a bent-shaped labyrinth is provided between a main plate of a ventilation fan and a fixed member opposed to the main plate of the ventilation fan, and the labyrinth is configured such that a gap between a radially outside portion of the ventilation fan and a radially inside portion of the fixed member, which is opposed to the radially outside portion of the ventilation fan, is greater than a gap between a radially inside portion of the ventilation fan and a radially outside portion of the fixed member, which is opposed to the radially inside portion of the ventilation fan.

6. The fully enclosed type motor with outer fans, according to claim 1, wherein the cooling hole formed in the outer peripheral part of the stator core is partly exposed to outside air prior to discharge of air.

7. The fully enclosed type motor with outer fans, according to claim 1, wherein a projection is provided within the cooling hole formed in the stator core.

8. The fully enclosed type motor with outer fans, according to claim 1, wherein the cooling hole formed in the stator core is defined by at least a connecting plate and a cover.

9. The fully enclosed type motor with outer fans, according to claim 1, wherein the ventilation fan has an irregular pitch of blades.

10. The fully enclosed type motor with outer fans, according to claim 1, wherein the ventilation fan is constituted by combining blades with different dimensions.

11. The fully enclosed type motor with outer fans, according to claim 1, wherein part of air fed from the first blades of the ventilation fan as cooling air is discharged to an outside from a core holder or a connecting bracket, and the discharged cooling air is brought in contact with an outer surface of the heat exchanger.

12. The fully enclosed type motor with outer fans, according to claim 1, wherein a connecting bracket or a fixed bracket is formed of a material, such as aluminum, which is the same as a material of the ventilation fan.

13. The fully enclosed type motor with outer fans, according to claim 1, wherein a hole opened in a fixed bracket in a region where air is discharged through the cooling hole in the stator core is defined to combine a plurality of cooling holes and is made longer than a cooling cross-sectional hole in a rotational-axis direction.

14. The fully enclosed type motor with outer fans, according to claim 1, wherein a labyrinth is provided between a fan main plate of the ventilation fan and the bracket.

15. The fully enclosed type motor with outer fans, according to claim 1, wherein a labyrinth is provided between a main plate of the fan and the housing.

16. The fully enclosed type motor with outer fans, according to claim 1, wherein the ventilation fan includes blades with long axial length and short axial length.

17. The fully enclosed type motor with outer fans, according to claim 1, wherein a projecting fin, which is radially extending like the blades of the ventilation fin, is provided on a main plate of the ventilation fan between the blades.

18. A car motor for driving wheels that run on rails, comprising:
- a motor body;
- an air passage formed in an outer peripheral part of a stator core disposed within the motor body;
- a ventilation fan with first and second blades fixed to a rotor shaft disposed in the motor body;
- an external heat exchanger disposed on a side of the motor body, which faces the rails; and
- a fin provided on the external heat exchanger in parallel with a direction of running of the wheels.

* * * * *

UNITED STATES PATENT AND TRADEMARK OFFICE
CERTIFICATE OF CORRECTION

PATENT NO. : 6,891,290 B2
DATED : May 10, 2005
INVENTOR(S) : Nagayama et al.

It is certified that error appears in the above-identified patent and that said Letters Patent is hereby corrected as shown below:

Column 14,
Lines 13 and 14, change "fin," to -- fan, --.
Line 25, change "fin" to -- fan --.

Signed and Sealed this

Ninth Day of August, 2005

JON W. DUDAS
*Director of the United States Patent and Trademark Office*